Aug. 18, 1931.  E. R. GERMAN  1,819,707
CONSTRUCTION AND METHOD OF MANUFACTURING REELS
Filed April 10, 1929    4 Sheets-Sheet 1

Inventor
Edgar R. German
By
Eric Schinger, Attorney

Aug. 18, 1931. E. R. GERMAN 1,819,707
CONSTRUCTION AND METHOD OF MANUFACTURING REELS
Filed April 10, 1929 4 Sheets-Sheet 2
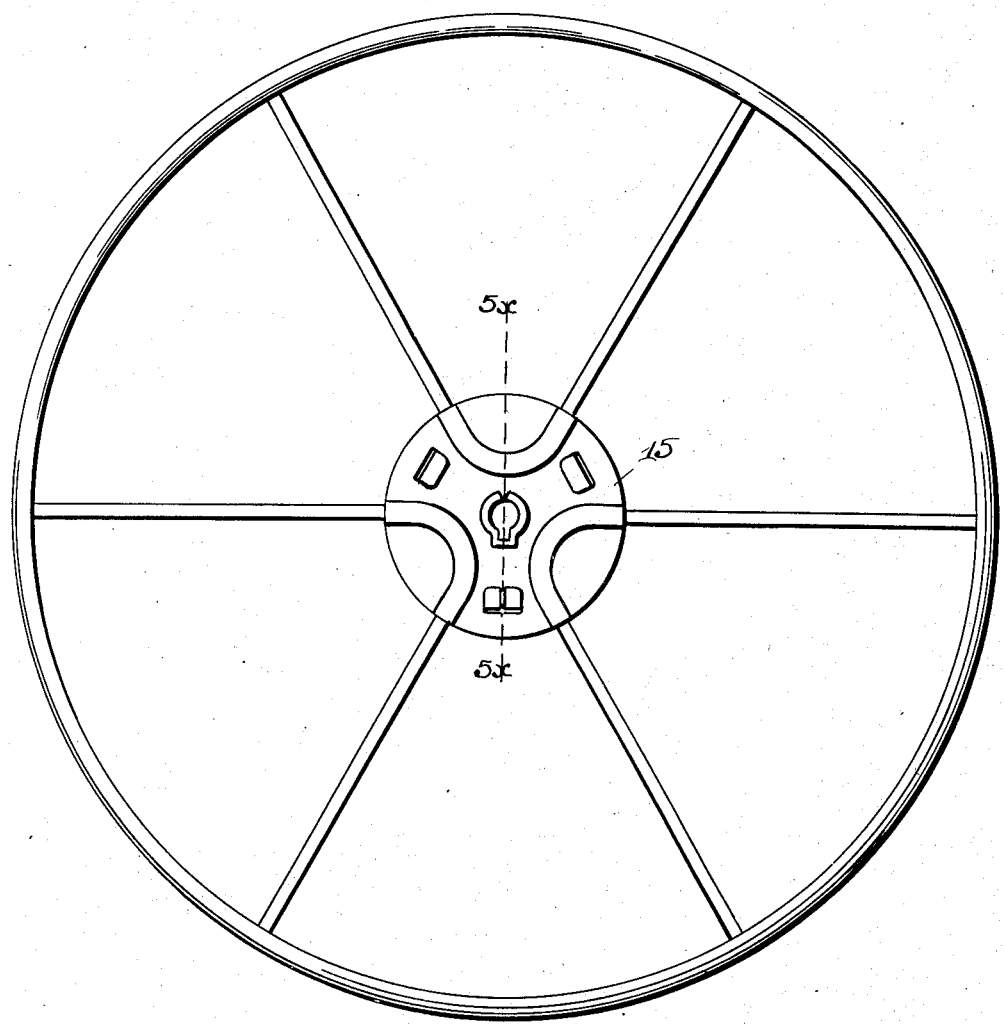
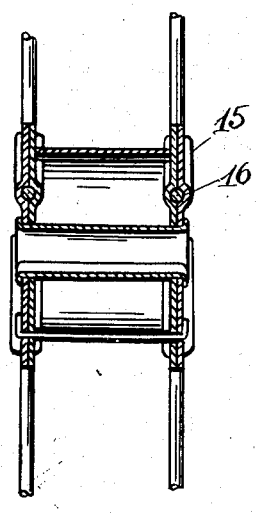
FIG. 5.
FIG. 4.
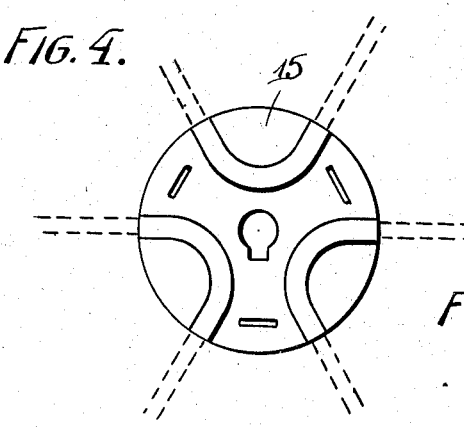
FIG. 6.
Inventor
Edgar R. German
By
Eric Schinger, Attorney Aug. 18, 1931.  E. R. GERMAN  1,819,707
CONSTRUCTION AND METHOD OF MANUFACTURING REELS
Filed April 10, 1929   4 Sheets-Sheet 3

Inventor
Edgar R. German
By
Eric Schinger Attorney

Aug. 18, 1931.  E. R. GERMAN  1,819,707
CONSTRUCTION AND METHOD OF MANUFACTURING REELS
Filed April 10, 1929  4 Sheets-Sheet 4
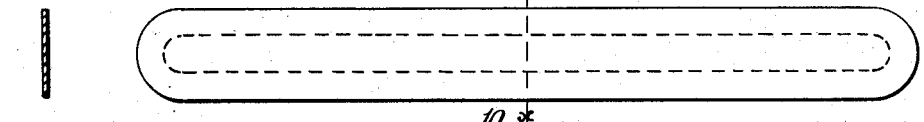

Patented Aug. 18, 1931

1,819,707

UNITED STATES PATENT OFFICE

EDGAR R. GERMAN, OF ROCHESTER, NEW YORK, ASSIGNOR TO TAYLOR SHANTZ COMPANY, A CORPORATION OF NEW YORK

CONSTRUCTION AND METHOD OF MANUFACTURING REELS

Application filed April 10, 1929. Serial No. 354,127.

This invention relates to the manufacture and construction of reels for moving picture films and has for its various objects:

To provide an improved method for constructing such a reel.

To provide a reel that is made up of combined wire and sheet metal sections in order to make the reel strong and rigid in construction, light in weight and inexpensive in its manufacture.

To provide a reel in which the parts of the reel can be made up of finished material having a suitable finishing coating in order to eliminate the finishing of the reel after it has been assembled.

All these and other objects of this invention will be apparent from the accompanying drawings, the specification and the appended claims forming a part thereof.

In the accompanying drawings:

Figure 4 is a front elevation of a modified form of the improved reel.

Figure 5 is a cross section of the central portion of the modified reel, the section being taken on the line 5x—5x of Figure 4.

Figure 6 is an elevation of one of the hub plates of the modified reel illustrated in Figures 4 and 5.

Figure 9 is a top plan view of the blank from which one of the rims of the reel is formed.

Figure 10 is a cross section of the blank, the section being taken on the line 10x—10x of Figure 9.

Figure 11 is a perspective view of the trough which is formed from the blank for the first step in the mechanical process of forming the rim of the reel.

Figure 12 is a sectional view of the trough, the section being taken on the line 12x—12x of Figure 11.

Figure 13 is a top plan view of the trough after its bottom has been pierced and punched out for the second step in the mechanical process of forming one of the rims of the reel.

Figure 14 is a cross section of the mutilated trough, the section being taken on the line 14x—14x of Figure 13.

Figure 15 is a top plan view of the trough after its sides and ends have been expanded and rolled into a circular shape from the outline illustrated in dotted lines in this same figure.

Figure 16 is a cross section of the circular rim illustrated in Figure 15.

Figure 17 is a top plan view of the hub plates of the reel.

Fig. 18 is a top plan view of one of the double spokes used in forming the reel.

Figure 19 is a top plan view of one of the rims, with the spokes and hub plate located within it ready to fasten these parts together.

Figure 20 is a cross section of the rim, spokes and hub plate, the section being taken on the line 20x—20x of Figure 19.

Figure 21 is a top plan view of one of the sides of the reel after it has been completed.

In the several figures of the drawings like reference numerals indicate like parts.

The construction of the reel and its method of manufacture forming the subject matter of this invention as illustrated, described and claimed in this and a copending application Serial No. 354,126 makes possible the manufacture of a reel for moving picture films which is strong and rigid in construction and cheaper in cost than any reel which has heretofore been made. This is due to several facts, chief among which is the mechanical process which is used in making the tubular sheet metal rims for the reel. Another important feature in the construction of the improved reel lies in the combination of wire sections and sheet metal sections and the manner in which these sections are fastened together to produce the finished reel.

Figure 1:
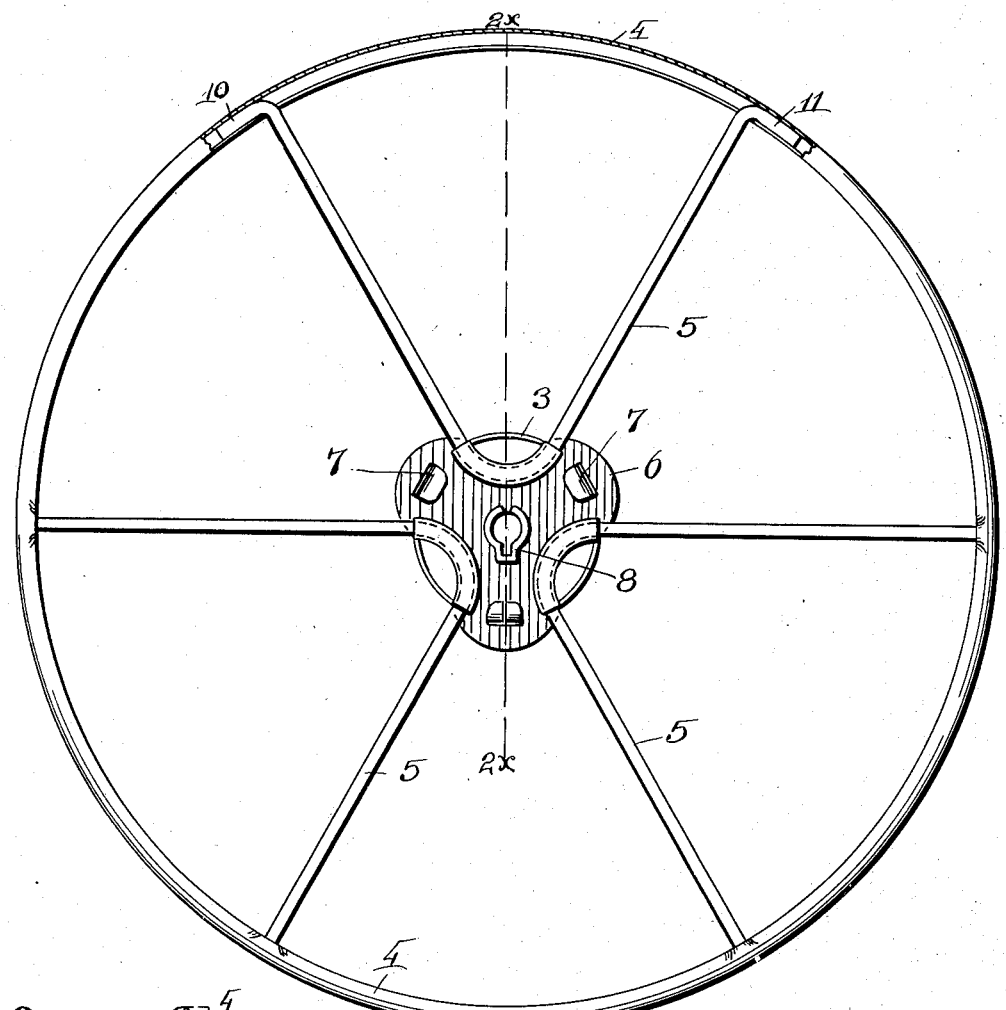
Figure 1 is a front elevation of the improved reel for moving picture films.
Figure 2:
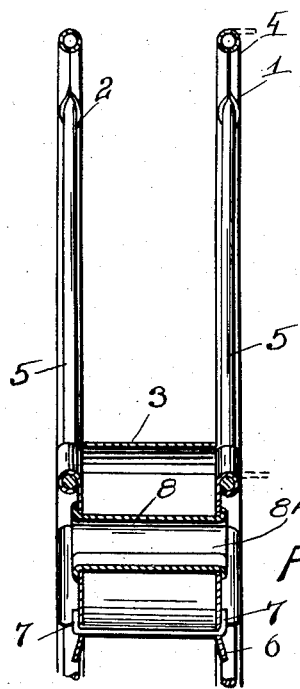
Figure 2 is a cross section of a portion of the reel, the section being taken on the line 2x—2x of Figure 1.
Figure 3:
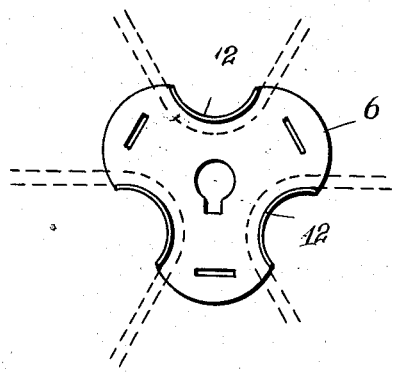
Figure 3 is an elevation of one of the hub plates of the reel as it appears before the spokes are fastened thereto.

In the form illustrated in Figures 1 and 2 the reel comprises the sides 1 and 2 which are spaced by the sheet metal hub 3. Each side of the reel in turn is made up of the tubular rim 4, three pairs of spokes 5, 5 and the hub plate 6. The hub 3 is provided at each end with the tongues 7, 7 which engage and project thru suitable slots 8 provided in each of the hub plates and when turned down on the outside of the hub plates, as illustrated in Figures 1 and 2, clamp the sides of the reel against the sheet metal hub. A sleeve 8 extends from the central opening of one hub plate to that of the other and its ends are expanded and flared on the outside of the openings to hold the sleeve in place therein and provide the bearing with an elongated bearing surface in the reel. The sleeve and the openings in the hub plate are formed so as to provide a keyway 8A the full length of the bearing.

Each side of the reel, as above pointed out, is constructed with a tubular sheet metal rim 4, the double spokes 5, 5 and the hub plate 6. The double spokes are formed by a triangularly bent wire in which the apex 9 is rounded to provide the connecting member between the inner ends of the double spokes. The outer or free ends 10 and 11 of the triangular wire form are bent outwardly and concentric to the rim 4 in which they are anchored as will hereinafter be described. The curved connecting member between the inner ends of the double spokes is clamped to the face of the hub plate which, for this purpose, is provided with a series of upturned flanges 12, 12. These flanges have a curved outline which corresponds with the curvature of the connecting sections of the inner ends of the spokes. The curved flanges 12 of the hub plate engage between the curved connecting member of the double spokes and are folded over the wire to encircle it and firmly clamp this portion of the spokes against the face of the hub plate. From an inspection of Figure 1 it will be seen that the curved connecting section between each pair of spokes extends from the periphery well toward the center of the hub plate so that by clamping this portion of the spokes to the hub plate, in the manner shown and described, the spokes are not only clamped against it but are also rigidly held in place on the hub plates and for all practical purposes form an integral part therewith.

In the modification of the construction of the reel illustrated in Figures 4, 5 and 6 the inner curved connecting sections of the double spokes are clamped in place between a hub plate that is made up in two parts. Each part of the hub plate comprises a plate 15 having a series of curved grooves 16 formed therein corresponding in outline to the curved connecting sections of the double spokes 5, 5. The grooves in two of the plates, which together make up a hub plate, face each other and are deep enough to receive the curved connecting ends of the double spokes so that when these individual plates are clamped together they firmly hold the inner ends of the spokes anchored in place between them.

Figure 7:
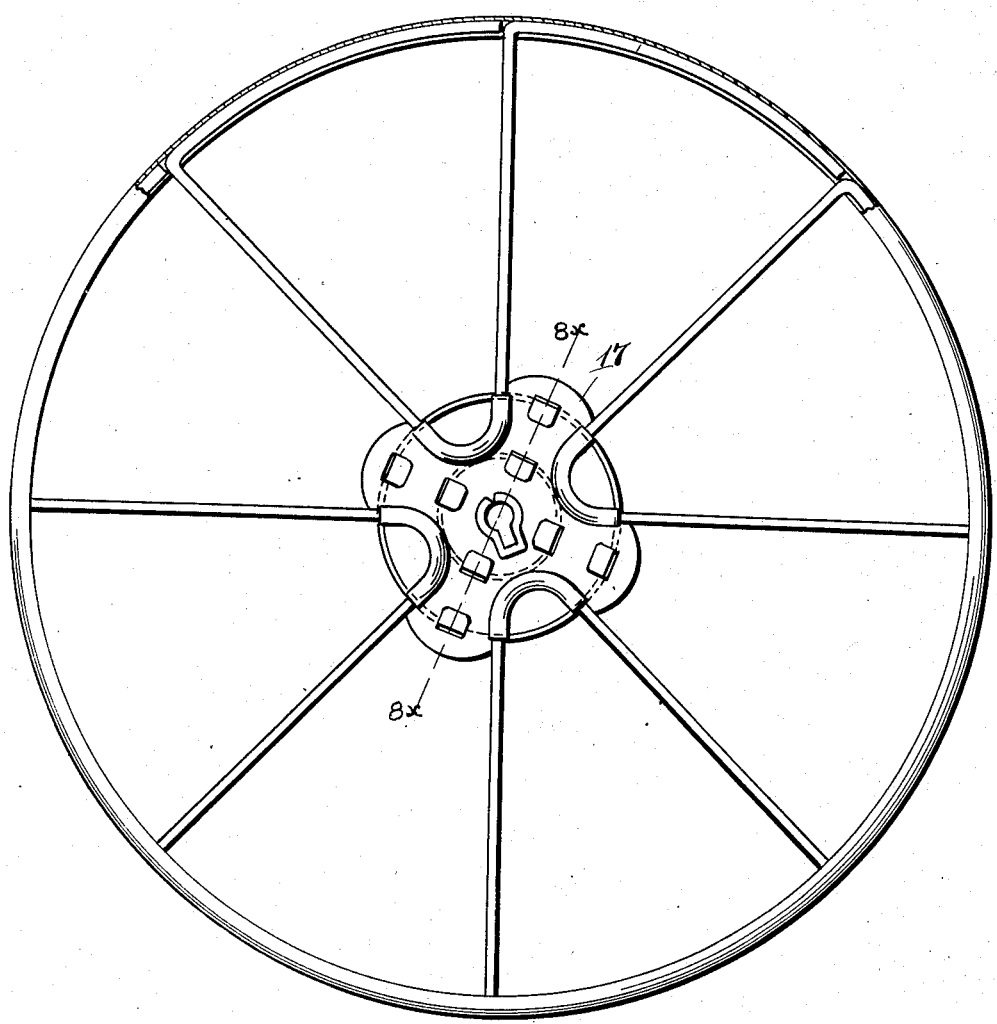
Figure 7 is a front elevation of another form of the improved reel.
Figure 8:
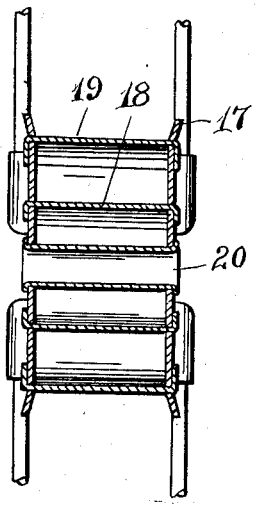
Figure 8 is a cross section of the central portion of the modified reel illustrated in Figure 7, the section being taken on the line 8x—8x of Figure 7.

In the construction illustrated in Figures 7 and 8 four sets of double spokes are used. This is necessary in reels having a large diameter. The hub plate 17 used for this form of reel is therefore provided with four flanges that clamp the inner ends of the double spokes in place and in addition the hub plates are connected by an intermediate hub sleeve 18 which is located between the hub sleeve proper 19 and the bearing sleeve 20 to increase the strength and rigidity of the hub plates. Another change in the construction of the larger reels is in the outer ends of the spokes 5, 5 which are anchored in the tubular rim. These ends instead of being short in length and being bent to project in opposite directions are long and project in the same direction. Their length extends between the outer ends of the radial portions of the spokes and thus completely fill the tubular rim which surrounds them. The laterally projecting ends of each pair of spokes in this way fills the space in the tubular rim between its radially projecting sections and the space between these sections and the radial sections of the adjacent pair of spokes. With the increase in the number of spokes the rigidity of the tubular rim which connects them is also thus increased.

In Figures 9 to 21 inclusive I have illustrated the method and manner in which one of the sides of the reels is constructed. The first and most important step in the manufacture of each side of the reel is the manner in which the tubular rim is formed. This rim is formed up from a blank 20 having suitable predetermined dimensions and an outline as illustrated in Figure 9. For the first step in the mechanical process the blank 20 is formed into a trough having a rounded bottom and rounded ends. Next, the bottom of the trough is pierced and punched out between the ends of the trough leaving but a short inwardly projecting flange at the bottom of the sides and ends of the mutilated trough. This is illustrated in Figures 13 and 14. The mutilated trough is then expanded from the form illustrated in dotted lines in Figure 15 to that illustrated in full lines in this figure and either during this expansion or after the expansion the straight edge of the rim thus formed is crimped inwardly to form another curved flange on the expanded rim opposite to the inwardly curved flange formed by mutilating the bottom of the trough. This is illustrated in section in Figure 20.

As above described a series of double spokes 5, 5 and a hub plate 6 complete one side of the reel in connection with the tubular rim. After the rim is therefore formed up to the point in which it is illustrated in section in Figure 20, the spokes 5, 5 and the hub plate 6 are placed within the rim. The rim is then folded into its tubular form and at the points where the ends of the spokes project into it the rim is folded around them. At the point where the radial sections of the spokes enter the tubular rim the edges thereof encircle the spokes as illustrated in Figure 2 thereby firmly holding the outer ends not only against radial displacement in the rim but also against lateral displacement therein. At the same time the rim is folded into its tubular form to anchor the outer ends of the spokes in place therein. The inner connected ends of each pair of spokes are clamped to the hub plate 6. This is done by folding over the upturned flanges provided on the hub plate to encircle the inner connecting ends of the spokes as illustrated in Figure 21 which shows the tubular rim and the hub plate with the spokes between them as they appear when a side of the reel is completed.

As will be apparent from the drawings and the description of the method of making the reel, the surfaces of the material that are cut in the manufacture of each part of the reel are practically negligible in area and some of them are even concealed after the parts have been assembled. For this reason the material, that is the wire and the sheet metal stock, can be provided with a finishing coat before it is made up into the different parts so that after the parts are assembled and the reel is mechanically finished no further finishing or coating need be given to the reel to provide a finished appearance for it.

In order to prevent the sides of the hub plates, which project above the hub, from coming in contact with the edge of the film as it is wound onto or unwound from the reel, these outwardly projecting portions of the hub plates, which are located between each pair of spokes, are bent outwardly between the spokes as illustrated near the bottom in Figure 2 and near the top and bottom in Figure 8. The outer edges of these outwardly projecting flanges of the hub plates are thus located between the spokes and cannot come in contact with the edges of the film that is wound on the reel.

I claim:

1. The method of making a reel which consists in forming each side of the reel from an elongated sheet metal blank having a limited length, forming said blank into a trough, piercing the bottom of the trough, expanding and forming said trough into an endless tubular rim, forming the wire spokes in pairs with their inner ends connected, anchoring the outer free ends of the pairs of spokes in the endless tubular rim and connecting the inner connected ends of the spokes with a hub plate.

2. The method of making a reel which consists in forming each side of the reel from an elongated flat and straight sheet metal blank, piercing the center portion of the blank, expanding the pierced straight blank into a narrower circular band, forming a plurality of wire spokes in pairs with each pair of spokes connected at their inner ends, connecting the outer ends of the spokes by folding the circular band into a tubular rim around the outer ends of the spokes and connecting the inner connected ends of the spokes with a hub plate.

3. The method of making a reel which consists in forming each side of the reel from a sheet metal blank, forming the blank into a trough, piercing the bottom of the trough and expanding and forming the pierced trough into an endless rim, forming a series of wire spokes with the outer ends bent concentrically to the endless rim and connecting the concentric ends by embedding them in said endless tubular rim in spaced relation to one another and connecting the inner connected ends of the spokes with a hub plate and backing a portion of the inner ends of the spokes with said hub plate.

4. The method of forming the side of a reel which consists in forming an endless rim, locating a plurality of spokes formed in pairs having their inner ends connected, clamping the connected ends of the spokes together with a hub plate and folding the endless band into a tubular rim around the outer ends of the spokes.

5. The method of forming the side of a reel which consists in first forming an endless rim, locating a plurality of wire spokes within said endless band, said spokes being arranged in pairs with their inner ends connected, clamping the connected inner ends of each pair of spokes to a hub plate and folding the endless band into a tubular rim around the outer ends of said spokes.

6. The side of a reel comprising a tubular rim, a series of wire spokes, said wire spokes being formed in pairs having their inner ends connected and their outer ends flared outwardly concentric to said tubular rim, the outer ends of each pair of spokes projecting into said tubular rim with the outwardly flaring ends extending along the inside of said tubular rim, a hub plate connecting the connected inner ends of said spokes.

7. The side of a reel comprising a tubular rim, a series of wire spokes, said wire spokes being formed in pairs having their inner ends connected and their outer ends bent concentrically to said tubular rim, said wire spokes extending into said tubular rim with the bent ends extending along the inside of said rim, a hub plate, flanges struck up from said hub plate and folded around the inner connected ends and a portion of the radially projecting sections of the spokes to clamp said spokes firmly against said hub plate.

8. The method of making a reel which consists in forming the spokes of the reel out of wire stock and in pairs with the inner ends of each pair connected, clamping the connected ends of each pair of spokes against the side of a sheet metal hub plate and connecting the outer ends of all of the spokes with a continuous sheet metal channel and spacing the outer ends of the spokes in said channel by closing the channel between the ends of the spokes.

9. The method of making a reel which consists in forming the spokes of the wheel out of wire stock and in pairs with the inner ends of each pair of spokes connected together, clamping the connected ends of each pair of spokes to a hub plate at a point intermediate of the center and the periphery of the hub and at the periphery of the hub, bending the outer ends of the wire spokes concentrically to the hub and encasing the bent outer ends with a continuous metal channel which is closed between the spokes to space the spokes in said channel and hold the channel in place on the spokes.

10. The side of a reel comprising a tubular rim, a series of wire spokes, said wire spokes having their outer ends flared outwardly concentric to said tubular rim, the outer ends of each pair of spokes projecting into said tubular rim with the outwardly flaring ends extending along the inside of said tubular rim, a hub plate connecting the connected inner ends of said spokes.

11. The side of a reel comprising a tubular rim, a series of wire spokes, said wire spokes having their outer ends bent concentrically to said tubular rim, said wire spokes extending into said tubular rim with the bent ends extending along the inside of said rim, a hub plate, flanges struck up from said hub plate and folded around the inner connected ends and a portion of the radially projecting sections of the spokes to clamp said spokes firmly against said hub plate.

In testimony whereof I affix my signature.

EDGAR R. GERMAN.